United States Patent [19]

Marantz

[11] Patent Number: 5,019,686

[45] Date of Patent: May 28, 1991

[54] HIGH-VELOCITY FLAME SPRAY APPARATUS AND METHOD OF FORMING MATERIALS

[75] Inventor: Daniel R. Marantz, Sands Point, N.Y.

[73] Assignee: Alloy Metals, Inc., Troy, Mich.

[21] Appl. No.: 247,024

[22] Filed: Sep. 20, 1988

[51] Int. Cl.$^5$ .................................................. B23K 9/04

[52] U.S. Cl. .................................... 219/76.14; 239/81; 427/423

[58] Field of Search .......................... 219/76.16, 76.14; 239/79, 80, 81, 84; 427/423

[56] References Cited

U.S. PATENT DOCUMENTS

| | | | |
|---|---|---|---|
| 1,930,373 | 4/1932 | Strubenrauch | 91/12.2 |
| 2,804,337 | 8/1957 | Marantz | 299/28.7 |
| 2,861,900 | 11/1958 | Smith et al. . | |
| 3,064,114 | 11/1962 | Cresswell . | |
| 3,131,091 | 4/1964 | Jones . | |
| 3,304,402 | 2/1967 | Thorpe . | |
| 3,947,607 | 3/1976 | Gazzard . | |
| 4,321,483 | 11/1981 | Altorfer et al. | 427/37 |
| 4,342,551 | 8/1982 | Browning . | |
| 4,358,053 | 11/1982 | Ingham et al. | 239/79 |
| 4,370,538 | 1/1983 | Browning . | |
| 4,416,421 | 11/1983 | Browning | 239/79 |
| 4,562,961 | 1/1986 | Guenard et al. | 239/79 |
| 4,593,856 | 6/1986 | Browning . | |
| 4,634,611 | 1/1987 | Browning . | |
| 4,711,627 | 12/1987 | Oeschale et al. . | |
| 4,740,395 | 4/1988 | Tsunekawa . | |
| 4,788,402 | 11/1988 | Browning | 219/76.16 |
| 4,836,447 | 6/1989 | Browning | 427/423 |
| 4,869,936 | 9/1989 | Moskowitz et al. | 239/79 |

FOREIGN PATENT DOCUMENTS

| | | |
|---|---|---|
| 516567 | 6/1920 | France . |
| 60-115777 | 3/1985 | Japan . |
| 60-115778 | 3/1985 | Japan . |
| 63-121648 | 5/1988 | Japan . |
| 1115738 | 5/1968 | United Kingdom . |
| 1257479 | 12/1968 | United Kingdom . |

*Primary Examiner*—Clifford C. Shaw
*Attorney, Agent, or Firm*—Dykema Gossett

[57] ABSTRACT

A supersonic flame spray apparatus capable of forming a high-energy stream of a particulate feedstock for flame spray applications. The flame spray apparatus includes a converging throat in which a two-stage exothermic reaction is created and maintained comprising a flame front and a steady-state continuous detonation. As fuel gas is injected into the flame front, a steady-state continuous detonation reaction is achieved in a fuel-rich zone. A partriculate feedstock is fed into the converging throat at a low-pressure region of the continuous detonation and then passes through the flame front heating the particles. The heated particles are entrained in the expanding combustion gases which flow in an axial high-velocity collimated particle spray stream through a tubular barrel. In one aspect, the flame spray apparatus includes a two-wire arc assembly positioned spatially along the axial center line of the particle stream exiting the barrel. The wires are melted by an electric arc in an arc zone and the molten metal is atomized by the collimated particle stream emerging from the barrel outlet to form a composite particle stream which contains two dissimilar feedstocks. Spray-formed materials are also provided including substantially fully dense metal-matrix composites which may be formed as coatings or as freestanding near-net shapes.

80 Claims, 5 Drawing Sheets

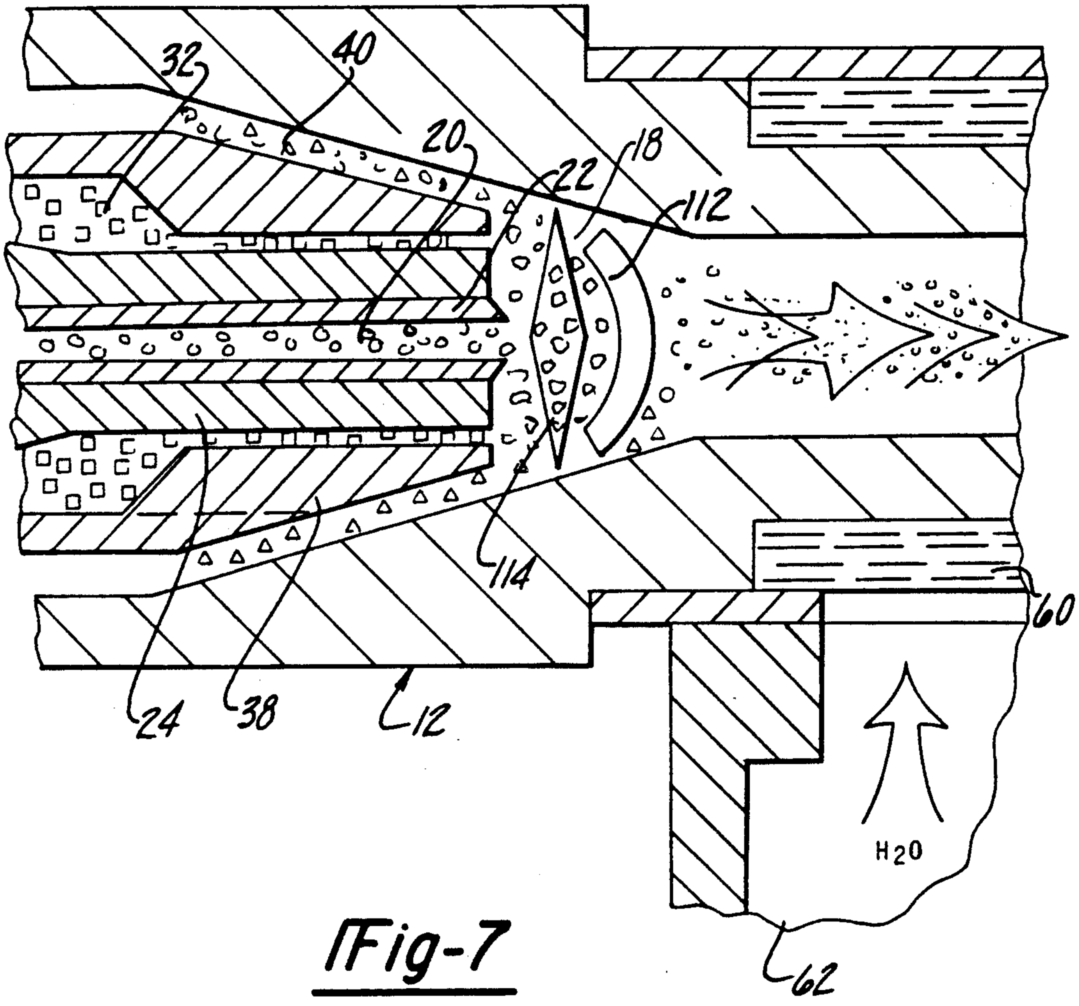
IFig-7

HIGH-VELOCITY FLAME SPRAY APPARATUS AND METHOD OF FORMING MATERIALS

TECHNICAL FIELD

The present invention relates generally to flame spray apparatus and to methods of thermally spraying materials. More specifically, the present invention relates to a high-velocity flame spray gun which utilizes a continuous detonation reaction to produce extremely dense materials such as coatings and freestanding near net shapes. Also provided are high-density materials formed by thermal spraying which have superior metallurgical and physical characteristics.

BACKGOUND OF THE INVENTION

Thermal spraying is utilized in numerous industries to apply protective coatings to metal substrates. More recently, thermal spray methods have been the focus of attention for the fabrication of high-tech composite materials as coatings and as freestanding near net structures. By heating and accelerating particles of one or more materials to form a high-energy particle stream, thermal spraying provides a method by which metal powders and the like may be rapidly deposited on a target. While a number of parameters dictate the composition and microstructure of the sprayed coating or article, the velocity of the particles as they impact the target is an important factor in determining the density and uniformity of the deposit.

One prior art deposition technique known as "plasma spraying" employs a high-velocity gas plasma to spray a powdered or particulate material onto a substrate. To form the plasma, a gas is flowed through an electric arc in the nozzle of a spray gun, causing the gas to ionize into a plasma stream. The plasma stream is at an extremely high temperature, often exceeding 10,000 degrees C. The material to be sprayed, typically particles from about 20 to 100 microns, are entrained in the plasma and may reach a velocity exceeding the speed of sound. While plasma spraying produces high-density coatings, it is a complex procedure which requires expensive equipment and considerable skill for proper application.

A combustion flame has also been used to spray powdered metals and other materials onto a substrate. A mixture of a fuel gas such as acetylene and an oxygen-containing gas are flowed through a nozzle and then ignited at the nozzle tip. The material to be sprayed is metered into the flame where it is heated and propelled to the surface of the target. The feedstock may comprise a metal rod which is passed axially into the center of the flame front or, alternatively, the rod may be fed tangentially into the flame. Similarly, a metal powder may be injected axially into the flame front by means of a carrier gas. Many combustion flame spray guns utilize a gravity feed mechanism by which a powdered material is simply dropped into the flame front. Conventional combustion flame spraying, however, is typically a low-velocity operation in the subsonic range and usually produces coatings which have a high degree of porosity.

In another spraying technique, an electric arc is generated in an arc zone between two consumable wire electrodes. As the electrodes melt, the arc is maintained by continuously feeding the electrodes into the arc zone. The molten metal at the electrode tips is atomized by a blast of compressed gas. The atomized metal is then propelled by the gas jet to a substrate, forming a deposit. Conventional electric arc thermal-sprayed coatings are generally dense and reasonably free of oxides, however the process is restricted to feedstock materials which are electrically conductive and available in wire or rod form which is unacceptable in some applications.

More recently, a modification of combustion flame spraying has produced high-density articles whcih exhibit metallurgical and physical properties that are superior to those produced using conventional flame spraying techniques. Commonly referred to as "supersonic" flame spray guns, these devices generally include an internal combustion chamber in which a mixture of a fuel gas, such as propylene or hydrogen, and an oxygen-containing gas is combusted. The expanding, high-temperature combustion gases are forced through a spray nozzle where they achieve supersonic velocities. A feedstock, such as a metal powder, is then fed into the high-velocity flame jet to produce a high-temperature, high-velocity particle stream. The velocities of the entrained particles produce coatings having higher densities than those produced by other subsonic combustion flame methods. Examples of these devices are shown in U.S. Pat. Nos. 4,342,551, 4,643,611 and 4,370,538 to Browning and U.S. Pat. No. 4,711,627 to Oeschale, et al.

Another flame spray apparatus is described in U.S. Pat. No. 2,861,900 to Smith, et al. Therein, a fluid combustible mixture is ignited in a barrel or nozzle element which comprises a confined space that is unconstricted from inlet to outlet. A feedstock, such as a metal powder, is introduced axially into the unconstricted barrel through which it is propelled to a target. The axial bore of the injector nozzle is utilized to convey both the fuel gas and the feedstock. Thus, feedstock is entrained in the fuel gas prior to combustion. During combustion, particle trajectories acquire radial components which may cause heated feedstock particles near the barrel wall to strike and accumulate on the wall surfaces. In addition, the effect of this particle motion is enhanced due to the large distance between the particle injection site and the combustion zone. This radial velocity also reduces the average velocity of the particles. As will be more fully explained, the present ivention overcomes these limitations and provides numerous other advantages by providing a supersonic flame spray apparatus in which a steady-state continuous detonation reaction is created that produces an axial, collimated flow of particles and which allows independent regulation of the particle injection rate and the fuel gas flow rate.

Prior art thermal spray methods have been used to form composite materials by simultaneously spraying two or more distinct materials. Ceramic-ceramic composites, and ceramic-metal composites known as "cermets" or "metal-matrix composites," have been formed as coatings and as freestanding, near net shape articles by techniques other than thermal spray processes. Materials may also be fabricated by forming a first particle stream using one spray gun and then combining the first stream with a particle stream from another gun to form a combined spray at the target surface.

A method of forming a protective coating in this manner is disclosed in U.S. Pat. No. 3.947,607 to Gazzard, et al. The use of an electric arc gun and a separate oxygen/combustion gas-metalizing gun to form a combined spray deposit is briefly described. However, the coatings formed using twin spray guns do not have superior properties. In addition, the use of two separate spray guns to form composite coatings is difficult and unwieldly. It would therefore be desirable to provide a single spray gun which could be used to form composite materials such as metal-matrix composites and which achieves the benefits of supersonic flame spraying and electric arc spraying without their disadvantages. The present invention achieves these goals by providing a supersonic flame spray system in which a high-energy particle stream of a first material atomizes a molten second material to form a composite particle stream.

SUMMARY OF THE INVENTION

The supersonic flame spray apparatus, systems and methods of this invention are particularly, but not exclusively, adapted to form the improved coatings and compositions of this invention, including metal-matrix composites and near net shapes. The improved flame spray apparatus is simple in construction, may be operated at a low rate of gas consumption, and is relatively maintenance free. The resultant high-performance, well-bonded coatings are substantially fully dense, having some characteristics of the wrought materials, and are substantially uniform in composition. Thus, the apparatus, method, and compositions of this invention have substantial advantages over the known prior art.

The supersonic flame spray apparatus of this invention which is utilized to form composites, including metal-matrix composites, includes a supersonic thermal spray gun which receives feedstock, preferably powdered or fine particulate feedstock, and which heats and accelerates the heated feedstock in fine particulate form to supersonic velocity. The disclosed embodiment of the supersonic thermal spray gun includes a tubular barrel portion having an inlet receiving the heated and accelerated particulate feedstock and an outlet directing the heated accelerated feedstock toward a target at supersonic velocity. The most preferred embodiment of the thermal spray gun of this invention, as described below, accelerates the gaseous combustion products of the fuel and oxidant to several times the velocity of sound or "hypersonic" velocity. Empirical measurements of exit gas velocities at various feed rates by counting the external diamonds generated in the exit stream indicate that hypersonic velocity can be achieved with the flame spray gun of this invention. Further, comparison of the supersonic flame spray apparatus of this invention and other commercial "supersonic" flame spray guns by this method indicates that the flame spray gun of this invention can achieve greater velocities than the prior art devices. Based upon accepted methods of calculation, assuming a hypersonic velocity of the gaseous combustion products, the velocity of the exiting particulate materials should be at least supersonic. As used herein, "hypersonic" velocity is at least twice the velocity of sound. It is also believed that the velocity of the heated and accelerated feedstock is "hypersonic." In any event, the resultant coatings using the improved supersonic flame spray apparatus of this invention have superior qualities, as described below. "Supersonic," as used herein, is generic to any velocity generally equal to or greater than the velocity of sound, including hypersonic velocities.

In forming composites, including metal-matrix composites, the supersonic flame spray apparatus further includes in one embodiment a liquid feed means for feeding a feedstock, preferably a molten metal feedstock, into the heated and accelerated powdered feedstock as it exits the barrel portion outlet. The accelerated particulate feedstock thus atomizes the liquid feedstock and projects the atomized liquid feedstock substantially uniformly distributed in the heated particulate feedstock toward the target. The resultant coating or composite is substantially fully dense as thermally sprayed and the composite is substantially uniform in composition. In the most preferred embodiment, the apparatus includes a two-wire arc thermal spray apparatus including means for feeding the ends of two wires continuously into the heated accelerated particulate feedstock adjacent the barrel portion outlet and an electric power means establishing an electric arc across the wire ends, melting the wire ends and forming the liquid metal feedstock.

Where the supersonic thermal spray apparatus is used to form a metalmatrix composite, the powdered or particulate feedstock may be a refractory material, including refractory oxides, refractory carbides, refractory borides, refractory silicides, refractory nitrides, and combinations thereof and carbon whiskers. The liquid feedstock in the disclosed embodiment may be any metal or other material in liquid or molten form or which is available in wire or rod form and may be melted using the twowire arc system. Thus, the supersonic thermal spray apparatus and methods of this invention may be utilized to form various fully dense and substantially uniform metalmatrix composites many of which cannot be formed by other known methods of thermal spraying.

The preferred embodiment of the supersonic flame spray apparatus includes a body portion having a feedstock bore which receives the feedstock and having an outlet communicating with a converging throat preferably coaxially aligned with the feedstock bore. The body portion includes a fuel passage having an inlet receiving a fluid fuel and outlet, preferably an annular outlet, surrounding the feedstock bore and communicating with the throat. The body portion of the gun also includes an oxidant passage having an inlet receiving an oxidant, preferably a gas such as oxygen, and an outlet communicating with the throat. In the preferred embodiment, the oxidant outlet is annular and surrounds the fuel outlet. The throat thus receives the fuel, which is preferably a gas such as propylene, and the oxidant from the annular passage outlets prior to mixing of the fuel and feedstock. The throat includes a conical wall spaced sufficiently from the fuel and oxidant passage outlets resulting in mixing and in partial combustion of the fuel and oxidant within the throat. As will be described more fully below, the fuel and oxidant may then be ignited to create a flame front within the throat initiating a shock which heats the incoming reactive fuel extremely rapidly, providing the driving force for sustaining the combustion from the energy liberated by the subsequent chemical reactions, thereby establishing what is referred to herein a continuous detonation and accelerating the feedstock and gaseous combustion products through an outlet at the apex of the conical wall. The apex of the conical wall is preferably coaxially aligned with the feedstock bore.

As now described, the preferred embodiment of the flame spray apparatus and method of this invention utilizes a two stage exothermic reaction within the converging throat which accelerates the gaseous products of combustion to hypersonic velocity as defined herein. The fuel and oxidant gas is fed into the converging throat, preferably through separate coaxially aligned annuli and ignited, creating a flame front within the converging throat, heating, expanding and accelerating the gaseous products of combustion through the converging throat outlet and the barrel portion of the gun.

In the preferred embodiment, fuel is fed adjacent the axis of the throat into the flame front, creating a fuel-rich continuous detonation zone behind the flame front in the confined space of the converging throat. This fuel rich mixture is then partially combusted in the steady state continuous detonation in the confined throat, increasing the energy of the continuous detonation and accelerating the feedstock through the flame front and into the barrel portion of the gun. The enveloping oxygen reacts with the remaining fuel in the flame front, sustaining the flame front and the continuous detonation. In the most preferred embodiment, the fuel and oxidant ratio fed into the throat through the separate passages produces a fuel rich condition further increasing the energy generated by the two stage exothermic reaction described.

In the most preferred embodiment of the flame spray apparatus of this invention, the annular oxidant gas passage converges relative to the fuel passage, toward the axis of the feedstock bore, directing the oxidant gas into and enveloping the flame front in the throat to react with the remaining fuel in the flame front, as described. Further, the cross-sectional area of the feedstock bore is preferably substantially less than the cross-sectional areas of the annular fuel and oxidant gas passage outlets, such that the particulate or powdered feedstock is fed into the convergent throat at a greater velocity than the fuel and oxidant gases. Finally, the inside diameter of the barrel is preferably several times the inside diameter of the powder bore, reducing the likelihood of the particulate or powder contaminating the internal surface of the barrel as the heated feedstock particulate is ejected through the barrel portion.

Thus, in accordance with the most preferred embodiment of the present invention, there is provided a flame spray apparatus which utilizes a continuous detonation reaction to supply thermal and kinetic energy to feedstock particles in a thermal spray operation. In one preferred embodiment, the flame spray apparatus includes a centrally disposed bore through which a feedstock material is fed to a continuous detonation zone defined by a converging throat coaxially aligned and in communication with the outlet of the feedstock bore. The converging throat has a converging conical wall adjacent and spaced from the feedstock bore outlet. The feedstock bore is defined by an axially aligned feedstock tube which is surrounded by wall elements which define two concentric annuli. The inner annulus serves as a passage for fuel gas and the outer annulus provides a passage for an oxidant gas. The outlets of the annular fuel gas passage and the annular oxidant gas passage are coaxially aligned and in communication with the converging throat. A barrel is provided which is attached to and axially aligned with the feedstock bore. The barrel is attached to the convergent end of the converging throat of the flame spray apparatus. In one embodiment, the barrel is surrounded by a heat exchange jacket.

In operation, and as provided in the method of the present invention, an oxidant gas, preferably oxygen or oxygen-enriched air, is flowed through the annular oxygen gas passage of the body portion while a fuel gas, preferably a high temperature fuel gas such as propylene or propane, is simultaneously flowed through the annular fuel gas passage. At the outlet of the annuli a fuel gas cone is enveloped by the oxidant gas in the converging throat. A portion of the fuel gas mixes at the interface of the fuel gas cone and the oxidant gas envelope to form a combustion mixture. This mixture is ignited by conventional ignition means such as a spark igniter at the end of the barrel. As the fuel gas and oxidant gas continue to flow, a flame front is established at the interface of the fuel gas and oxidant gas envelope. A temperature and pressure gradient is established in the converging throat with the region of the flame front being at a temperature substantially higher than the ignition temperature of the fuel gas. As fuel gas enters this high-temperature and pressure, fuel-enriched region, continuous detonation occurs to produce a low-pressure zone adjacent the annuli outlets seperate from a following high-pressure zone in the converging throat which accelerates the feedstock. During this continuous detonation, a feedstock material is fed axially into the low-pressure zone and then through the flame front, which in combination accelerates the gases through the converging throat. The feedstock particles are entrained by the hot, high-pressure combustion gases and are accelerated by the heat and momentum transfer of the continuous detonation through the converging throat and through the barrel. As the particles move through the converging throat, the particle trajectories and gas flow are axially aligned as the spray stream enters the barrel. The extremely high-velocity feedstock particles then pass through the throat and exit the throat outlet as a highly collimated particle stream.

In another aspect, the thermal spray apparatus of the present invention includes means for supplying a molten metal to the collimated particle stream to form a composite particle stream. In one embodiment, the collimated particle stream atomizes molten metal of a two-wire electric arc system spatially positioned on the axial centerline of the gas exiting the spray gun barrel outlet.

The present invention further includes high-density composite coatings and freestanding bulk or near net shape articles made with the apparatus and by the method of the present invention. In one embodiment, a powdered feedstock is passed through the feedstock bore using an inert carrier gas. The high-velocity collimated particle stream issuing from the barrel atomizes molten metal in the two-wire electric arc to form high-density metal-matrix composite compositions as coatings and as freestanding near-net shape articles having superior metallurgical and physical characteristics, several of which cannot be formed by any other known thermal spray method.

These and numerous other features and advantages of the present invention will be described more fully in connection with the detailed description of the preferred embodiments and with reference to the drawings.

BRIEF DESCRIPTION OF THE DRAWINGS

FIG. 7 is a diagrammatic illustration of the flow regime of fuel gas, oxidant gas and feedstock into the converging throat portion of the supersonic thermal spray apparatus.

DESCRIPTION OF THE PREFERRED EMBODIMENT OF THE INVENTION

Figure 1:
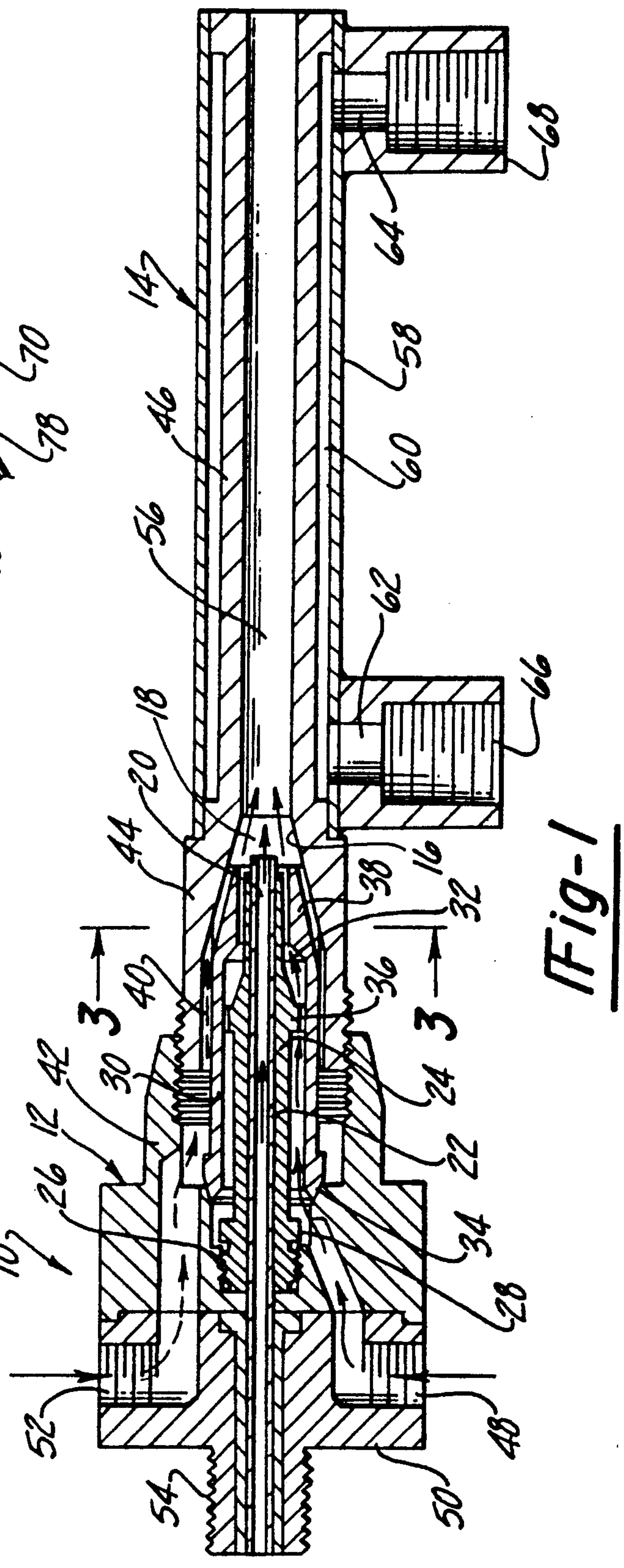
FIG. 1 is a longitudinal cross-section of the flame spray gun in one embodiment of the present invention.

Referring now to FIG. 1 of the drawings, flame spray apparatus 10 is shown generally having burner housing 12 and barrel 14 which is shown in this embodiment as integral with burner housing 12. Conical wall 16 of burner housing 12 defines converging throat 18 in which a continuous detonation reaction is carried out during operation of flame spray apparatus 10. Feedstock supply bore 20 is defined by feedstock supply tube 22, which is closely received within feedstock housing 24. As will be explained more fully, feedstock supply tube 22 may become worn after continued use, particularly where the feedstock comprises a metal or ceramic powder entrained in a carrier gas. It is therefore preferred that feedstock supply tube 22 be releasably engaged in housing 24 so that it can be easily replaced. Although many materials are suitable for forming the various parts of the invention, it is preferred that feedstock supply tube 22 be formed of a hard, wear-resistant material such as steel.

Feedstock housing 24 is provided with a threaded end 26 which is received in a tapped portion of burner housing 12. Collar 28 may be provided to aid in seating feedstock housing 24 in position. Feedstock housing 24 and feedstock supply tube 22 are disposed within fuel supply nozzle 30 such that an annular fuel passage 32 is defined. End 34 of fuel nozzle 30 is tapered and press fitted into burner housing 12.

Figure 2:
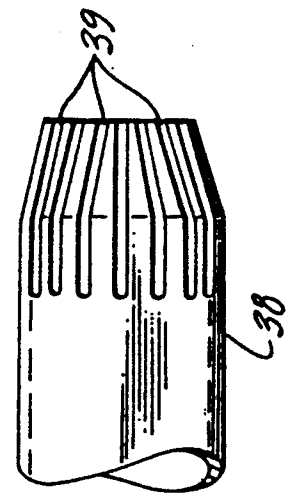
FIG. 2 is a side elevational view of the fuel nozzle of the present invention.
Figure 3:
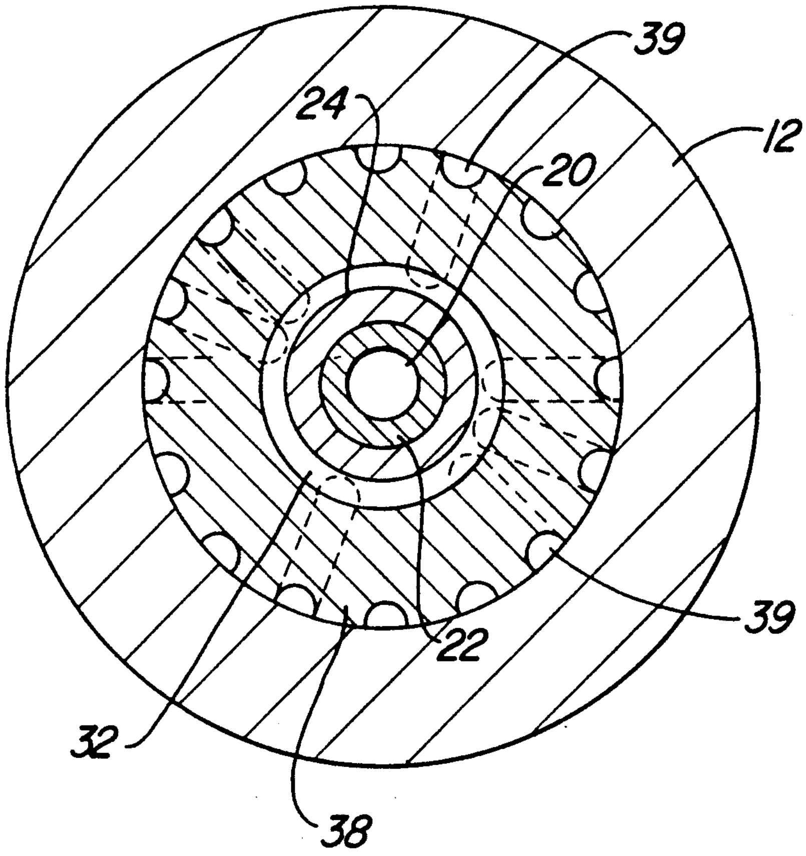
FIG. 3 is a cross-section along lines 3—3 of FIG. 1.

Feedstock housing 24 includes a second collar or flanged portion 36 which engages fuel nozzle 30. Collar 36 is provided with longitudinal channels axially aligned with feedstock bore 20. Fuel flowing through annular fuel passage 32 in the direction shown by the arrows is thus not significantly obstructed by collar 36 during operation. That is, collar 36 has a channeled outer surface such that it can function as a spacer with respect to fuel nozzle 32 and yet still allow substantially unconstricted flow of fuel through annular fuel passage 32. In a similar manner, end portion 38 of fuel nozzle 30 is provided with a series of substantially parallel longitudinal channels 39 as shown in FIGS. 2 and 3 of the drawings. Again, this channeled construction allows end portion 38 of fuel nozzle 30 to engage conical wall 16 while permitting an oxidant to flow through annular oxidant passage 40 into converging throat 18.

While numerous configurations of flame spray apparatus 10 are possible if the principles of the present invention are faithfully observed, in this embodiment annular oxidant passage 40 is an annulus defined by sections 42 and 44 of burner housing 12. It will be noted that section 44 also provides conical wall 16. As stated, body section 44 is shown integral with barrel 14 although burner housing 12 and barrel 14 may be formed separately if desired. In order to rigidly attach section 44 to section 42, section 42 is tapped to receive a threaded portion of section 44. It may also be desirable to form burner housing 12 as a single unitary structure in some applications.

Leading into annular fuel passage 32, fuel supply passage 48 is provided which extends through end portion 50 of burner housing 12 and is in flow communication with annular fuel passage 32. This continuous passage serves as a channel through which a fuel is conveyed to a flame front in converging throat 18. Similarly, annular oxidant passage 40 is in flow communication with oxidant inlet passage 52. End portion 50 includes connector 54 which may be treaded for the connection of a feedstock supply hose. During operation of flame spray apparatus 10, a powdered feedstock is introduced into feedstock bore 20 via connector 54. Although feedstock supply tube 22 is shown in the drawings as comprising a continuous structure through burner housing 12, including through end portion 50, it may be desirable to simply omit that portion of feedstock supply tube 22 which spans end portion 50. In this alternative construction, the diameter of the bore of feedstock housing 24 which closely receives feedstock supply tube 22 may be reduced at end portion 50 to match the diameter of feedstock bore 20.

The cross-sectional area of feedstock bore 20 should be substantially less than the cross-sectional area of annular fuel passage 32 and annular oxidant passage 40 such that powdered feedstock can be fed into converging throat 18 at a sufficient velocity to penetrate the flame front. It is preferred that the area of feedstock supply bore 20 be less than about 15 percent and more preferably less than about 10 percent of the cross-sectional areas of either annular fuel passage 32 or annular oxidant passage 40. Also, the ratio of the diameter of powder supply bore 20 to the internal diameter of spray passage 56 is preferably about 1:5. The ratio of cross-sectional areas is thus preferably about 1:25.

Barrel 14 which is a tubular straight bore nozzle includes hollow cylindrical section 46 which defines spray passage 56. As will be described more fully, high-velocity particles are propelled through passage 56 as a collimated stream. In order to prevent excessive heating of barrel wall 46, and to provide an effect referred to herein as "thermal pinch," a phenomenon which maintains and enhances collimation of the particle stream, heat exchange jacket 58 is provided which defines an annular heat exchange chamber 60. Heat exchange chamber 60 is limited to barrel 14 so that heat is not removed from converging throat 18. During operation of flame spray apparatus 10, a heat exchange medium such as water is flowed through heat exchange chamber 60 via channels 62 and 64. Hoses (not shown) are each attached at one end to connectors 66 and 68 to circulate heat exchange medium through heat exchange chamber 60.

This completes the structural description of flame spray apparatus 10 in one preferred embodiment. Many variations are possible. The operation of flame spray apparatus 10 will be set forth below in connection with an explanation of the spraying methods of the present invention. It is also to be understood that it may be suitable to use flame spray apparatus 10 in applications other than forming coatings and near-net shapes. For example, due to the extremely high velocities achieved by the present invention it may be desirable to use flame spray apparatus 10 in sandblasting operations or the like and any such use is intended as falling within the scope of the present invention.

In another embodiment of the present invention, a flame spray system 10′ which embodies the features of flame spray apparatus 10, with like reference numerals depicting like parts, further includes a molten metal supply means for introducing a second material into the collimated particle stream which emerges from the barrel outlet.

Figure 4:
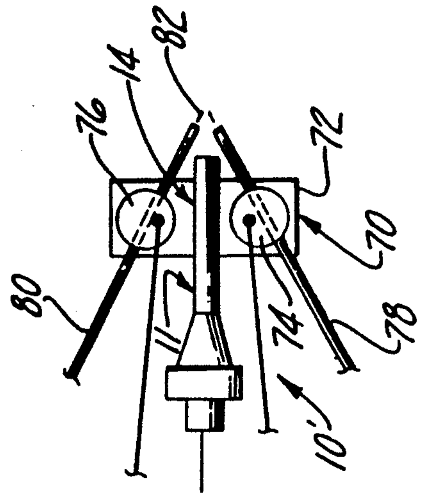
FIG. 4 is a plan view of the supersonic thermal spray gun with electric arc assembly of the present invention.

Referring now to FIG. 4 of the drawings, flame spray system 10′ is shown in which means for supplying a molten metal to a collimated particle stream adjacent the outlet of barrel 14 is provided. By providing a flame spray apparatus having a molten metal supply means in this manner, high-density, metal-matrix composites can be spray formed. As shown in FIG. 4, in one embodiment of the present invention, the molten metal supply means comprises a two-wire electric arc assembly 70. Arc assembly 70 includes carriage 72 which houses wire guides 74 and 76. Wire guides 74 and 76 are provided to guide wires 78 and 80 at a predetermined rate toward arc zone 82. The included angle of wires 78 and 80 is preferably less than about 30 degrees in most applications. An electric arc of predetermined intensity is struck and continuously sustained between the ends of the wire electrodes. As will be appreciated by those skilled in the art, wires 76 and 78 are formed of a consumable metal which melts in arc zone 82.

The basic structure of gun 11 is identical to that fully described in connection with flame spray apparatus 10. Carriage 72 may be attached to gun 11 at any convenient location and may be detachable. In FIG. 4, carriage 72 is shown attached to barrel 14. Suitable clamps or brackets (not shown) may be used for this purpose. Wires 78 and 80 are continuously fed toward an intersecting point in arc zone 82 as they are melted and consumed as atomized molten metal. While the distance of arc zone 82 from the end of barrel 14 is not critical and can be adjusted to regulate various characteristics of the coating or article formed during the spraying operation, the ends of wires 78 and 80 are preferably located from about 4 to about 10 centimeters from the end of barrel 14. The arc and molten metal wire ends should be directly within the collimated particle stream issuing from barrel 14, in other words, along the longitudinal axis of barrel 14.

Figure 5:
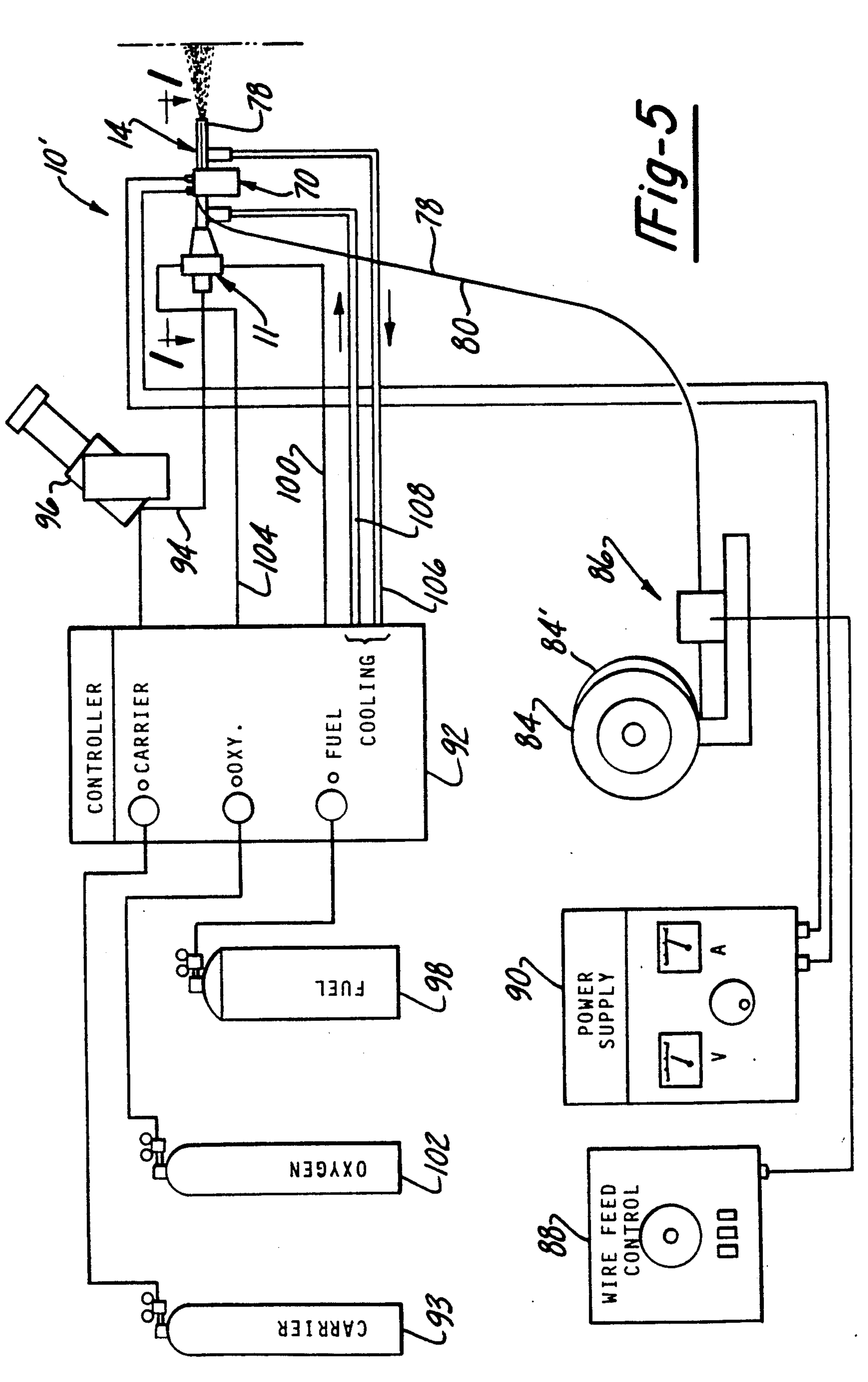
FIG. 5 is a diagrammatic representation of the method and apparatus of the present invention in the embodiment which includes a two-wire electric arc.

Referring now to FIG. 5 of the drawings, flame spray system 10′ is illustrated having two-wire electric arc assembly 70 from which, as stated, wires 78 and 80 are fed from wire spools 84 and 84′ in wire feed system 86. Wire feed control unit 88 controls wire feed assembly 86. In the manner of conventional two-wire electric arc spraying, power supply 90 is provided by which wires 78 and 80 are energized to form an electric arc in arc zone 82. Master controller 92 is shown by which the various gas flow rates are regulated. Master controller 92 may also provide means for controlling the flow rate of heat exchange medium which cools barrel 14. A bank of gas cylinders is provided which includes an inert carrier gas source 93 such as nitrogen which is utilized in those applications in which the feedstock is injected as a powder. Alternatively, it may be desirable to use an oxidant gas as a carrier, such as when spraying high-temperature refractory oxides to provide better melting. Accordingly, feedstock powder is metered into line 94 from powder feeder 96 which may be of conventional design. A fuel source 98 such as a fuel gas provides fuel to gun 11 through conduit 100 which is in flow communication with fuel passage 32. Similarly, an oxidant source 102 such as an oxygen-rich gas is flowed through gas supply line 104 to oxidant passage 40. Heat exchange medium is flowed through heat exchange chamber 60 via pipes 106 and 108 which are attached to adapters 66 and 68 of gun 11.

A number of fuel and oxidant sources may be used in the present invention. Liquid or particulate fuels or oxidants may be suitable. For example, it is anticipated that liquid diesel fuel may be used as the fuel. The preferred fuels and oxidants for use in the present invention are gases. The choice of fuel is dictated by a number of factors, including availability, economy, and, most importantly, by the effect which a particular fuel has on the spraying operation in terms of rate of deposit and on the metallurgical and physical characteristics of the spray deposit. For the oxidant, most oxygen-containing gases are suitable. Substantially pure oxygen is particularly preferred for use herein. Suitable fuel gases for achieving high-velocity thrust of spray materials in the present invention are hydrocarbon gases, preferably high-purity propane or propylene, which produce high-energy oxidation reactions. Hydrogen may also be suitable in some applications. Mixtures of the preferred fuel gases may also be desirable. It should be noted that the present invention is particularly adapted to permit control of the flame temperature and the particle temperature of sprayed materials by proper fuel selection as well as by controlling gas pressures and the dwell or residence time of the particles in converging throat 18.

By controlling the composition of the fuel and the gas pressure, a wide range of particle velocities can be attained. The preferred fuel gas pressure ranges from about 20 to about 100 psig and more preferably from about 40 to about 70 psig. The oxidant gas pressure will typically range from about 20 to about 100 psig and preferably from about 40 to about 80 psig for most applications. When operated within these ranges, velocities of the emerging combustion products from barrel 14 will be supersonic as evident by diamonds in excess of twelve in the exit stream and significantly greater than velocities of conventional flame spray guns under similar operating conditions. It will be appreciated that the nature of the fuel gas and its mass flow closely dictate velocity.

Figure 6:
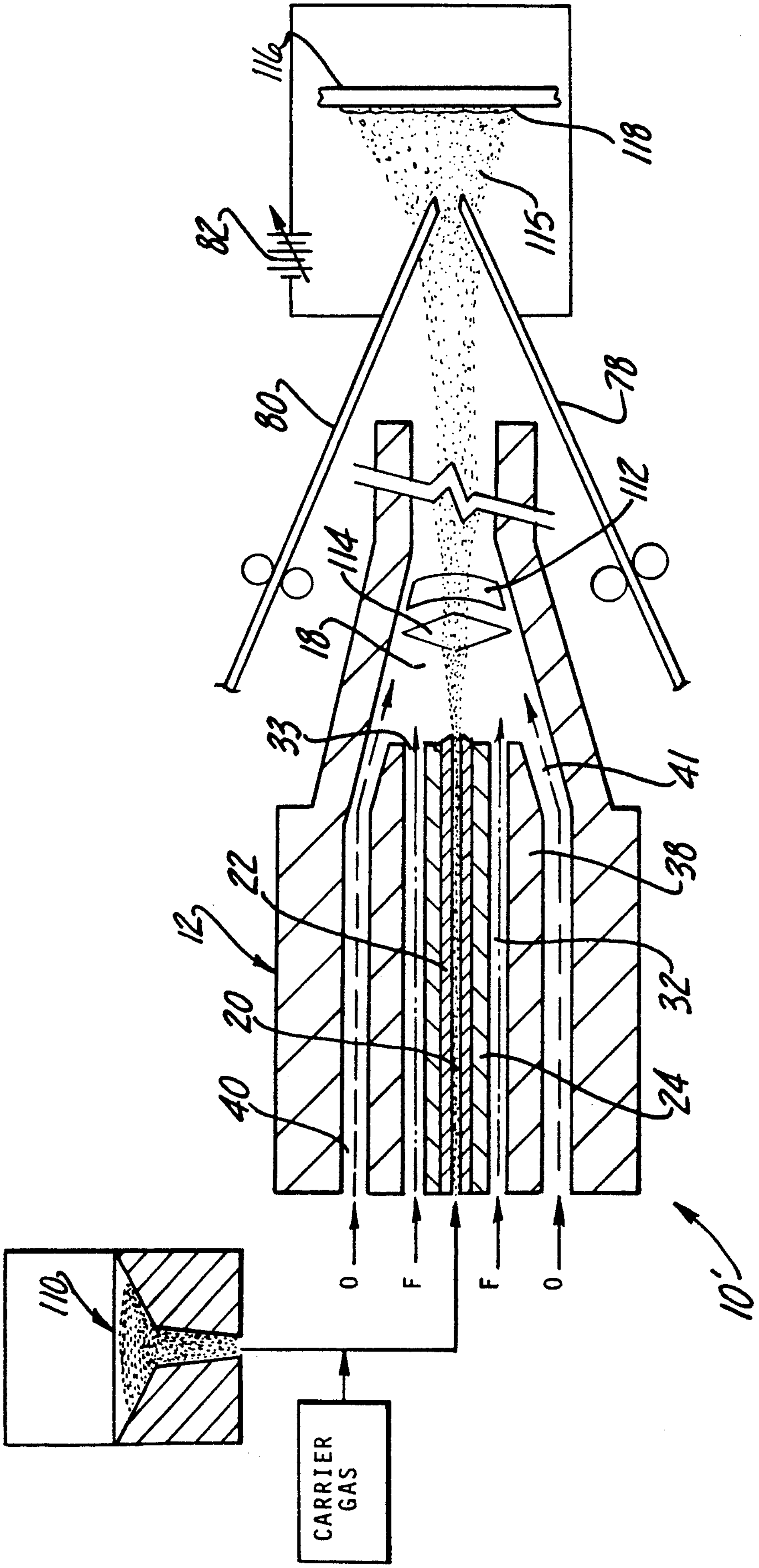
FIG. 6 is a diagrammatic representation which demonstrates the formation of a flame front in the converging throat of the spray gun and the creation of a collimated particle stream which exits the barrel outlet and atomizes molten metal from a two-wire arc.

The operation of flame spray apparatus 10 and flame spray system 10′ and the methods provided by the present invention will now be explained. Referring to FIG. 6 of the drawings, flame spray system 10′ is shown diagrammatically in which a powdered feedstock 110 is injected through feedstock bore 20. In this embodiment, the powdered feedstock 110 is entrained in an inert carrier gas. Concurrently therewith, a fuel, such as propylene is flowed through annular fuel passage 32 at a suitable pressure. The fuel gas enters converging throat 18 at fuel outlet 33. An oxidant, for example oxygen, is simultaneously flowed through annular oxidant passage 40. Again, the preferred fuels and oxidants are gases, although other fuels and oxidants, such as liquids or the like, may be acceptable. As the oxidant gas exits outlet 41 it forms an envelope of oxidant gas surrounding a cone of fuel gas. It will be noted in FIG. 6 that the geometry of annular oxidant passage 40 is somewhat convergent with respect to annular fuel passage 32. In other words, the end of fuel nozzle 38 is preferably frusto-conical in shape. This configuration permits the oxidant gas to converge into the fuel gas stream. The angle of convergence is preferably from about 20 to about 40 degrees and most preferably about 30 degrees, which has been found to provide very stable gas flow through converging throat 18. As the fuel gas-oxidant gas mixture initially flows from the end of barrel 14, the mixture is ignited at the barrel end by any convenient means such as a spark ignitor. An igniter within barrel 14 or converging throat 18 may be suitable in some applications.

As shown in FIGS. 6 and 7 of the drawings, a two-stage exothermic reaction is carried out in the present invention. A flame front 112 is established at the interface of the oxygen envelope and the fuel gas cone. Importantly, flame front 112 is confined to converging throat 18. Flame front 112 establishes a high-temperature zone or region in converging throat 18. As fuel gas continues to emerge from outlet 33 into converging throat 18, it creates a fuel-rich continuous detonation zone behind flame front 112, producing continuous detonation of the fuel gas. The high-temperature region produced by flame front 112 is at a temperature substantially in excess of the ignition temperature of the fuel gas, and produces a high temperature and pressure region. As the fuel gas enters this high-temperature, high-pressure region, the fuel gas rapidly ignites, reacting with the oxidant gas and producing rapidly expanding combustion gases. The enveloping oxygen then reacts with the remaining fuel in the flame front, sustaining the flame front and the continuous detonation. This phenomenon of steady-state continuous detonation in a fuel-rich zone continues so long as the flow of fuel gas and oxidant gas are uninterrupted.

Continuous detonation in converging throat 18 creates a low pressure region shown generally by 114. During continuous detonation, a feedstock, such as a powdered metal, ceramic material or rod, is injected through feedstock supply bore 20 into the ongoing continuous detonation reaction in converging throat 18. The low-pressure region at the outlet of feedstock supply bore 20 from the high-pressure zone in the converging throat which allows the powdered feedstock to be injected into converging throat 18 at extremely high velocities.

One of the many advantages provided by the present invention is the ability to regulate the velocity at which particles of feedstock are injected into the flame front. Unlike many prior art devices, the present invention permits independent regulation of particle injection rate, fuel gas flow rate, and oxidant gas flow rate. This is possible in the disclosed embodiment of the present invention because neither the fuel gas nor the oxidant gas are used to carry the feedstock at any point in the system. The feedstock particles are injected into the flame front by an independent stream of an inert carrier gas. By allowing independent regulation of flow rates, turbulence in converging throat 18 can be substantially reduced by maintaining the pressure of the carrier gas at a higher value than the fuel gas pressure, which increases particle velocities. The range of carrier gas pressure is from preferably about 40 to about 70 psig, more preferably from about 50 to about 60 psig, and most preferably always greater than the pressure of fuel gas. Also, although the relative dimensions of outlets 33 and 41 can vary widely, as stated, the inner diameter of feedstock supply tube 22 is preferably considerably smaller than the cross-section of annular fuel passage 32 or annular oxidant passage 40. Hence, it will be appreciated that the diameter of feedstock supply bore 20 is shown somewhat exaggerated in the drawings. It is also preferred that the ratio of the cross-sectional areas of feedstock supply bore 20 to spray passage 56 of barrel 14 be about 1 to 25 to reduce the likelihood of the particles contacting and adhering to the internal surface of barrel 14 during spraying. By maintaining the carrier gas pressure above about 50 psig where the fuel gas pressure is from about 45 to 65 psig and the oxidant gas pressure is from about 70 to 90 psig, a phenomenon referred to as "spitting" is prevented which occurs at lower carrier gas pressures. Spitting results from radial movement of particles which may adhere to conical wall 16 and is believed to occur at lower carrier gas pressures due to increased turbulence. Thus, maintaining the carrier gas pressure at high values reduces turbulence.

As the feedstock particles move into converging throat 18, the thermal and kinetic energy of the particles is substantially increased by the exothermic continuous detonation reaction. The energetic feedstock particles pass through converging throat 18 to form a collimated stream of high-energy particles which are propelled in a substantially straight line through passage 56 of barrel 14. Another significant advantage of the present invention over prior art spray guns is the reduction in turbulent radial movement of the spray particles. By providing a non-turbulent flow of gas into converging throat 18, and sustaining a continuous detonation reaction confined to converging throat 18, axial, substantially non-turbulent flow of the combusting gases and the feedstock particles is achieved which results in a high-velocity collimated particle stream. Also, as the particle stream passes through barrel 14, spreading of the stream is reduced by removing heat from barrel wall 46 with heat exchange jacket 58. By cooling barrel 14 in this manner, a thermal pinch is created which further reduces any radial movement of the energized particles toward the side walls of barrel 14.

Numerous powdered materials which may be sprayed by the present invention include metals, metal alloys, metal oxides such as aluminia, titania, zirconia, chromia, and the like and combinations thereof; refractory compounds such as carbides of tungsten, chromium, titanium, tantalum, silicon, molybdenum, and combinations thereof; refractory borides such as chromium boride, zirconium boride and the like and combinations thereof; silicides and nitrides may also be used in some applications. Various combinations of these materials may also be suitable. These combinations may take the form of powdered blends, sintered compounds or fused materials. While a powdered feedstock is preferred, a feedstock in the form of a rod or the like may be fed through feedstock supply bore 20 if desired. Where the feedstock comprises a powder, the particle size preferably ranges from about 5 microns to about 100 microns, although diameters outside this range may be suitable in some applications. The preferred average particle size is from about 15 to about 70 microns.

The present invention further comprises coatings and near-net shapes formed in accordance with the method of the present invention. Where these materials are high-density metal matrix materials, they have not been formed by any other known thermal spray operation. As will be known to those skilled in the art, freestanding, near net shapes may be formed by applying a spray deposit to a mandrel or the like or by spray-filling a mold cavity. Suitable release agents will also be known.

Referring again to FIG. 6 of the drawings, in another embodiment, flame spray system 10' is used in a method of forming composites in which a first feedstock is provided through feedstock supply bore 20 and a second feedstock material is added downstream of converging throat 18. Most preferably, this is achieved by adding a second feedstock material to the collimated particle stream which emerges from barrel 14. More specifically, a powdered feedstock material or the like is injected into flame front 112 in the manner previously described. As the collimated particle stream exits barrel 14, it is passed through arc zone 82. During this passage, wires 78 and 80 are electrically energized to create a sustained electric arc between the ends of the wires. A voltage sufficient to melt the the ends of wires 78 and 80 is maintained by power supply 90. A voltage between about 15 to about 30 volts is preferred. As molten metal forms at the wire ends, the particle stream from gun 11 atomizes the molten metal. To maintain the electric arc and to provide a continuous supply of molten metal to the spray stream, wires 78 and 80 are advanced at a predetermined rate using wire feed control 88. As the molten metal is atomized, a combined or composite particle stream 115 is formed which contains both feedstock materials in particulate form. Although some turbulence is created by the presence of wires 78 and 80, composite particle stream 115 maintains good collimation. Composite stream 115 is then directed to target 116 where it forms deposit 118.

In still another embodiment, the present invention provides high-density composite materials such as metal-matrix composites or cermets in the form of sprayed coatings or near-net shapes. More specifically, by utilizing the capability of flame spray system 10' to form a composite spray stream which includes two dissimilar materials such as a refractory oxide and a metal, novel high-density structures can be fabricated. As shown in FIG. 6 of the drawings, a refractory oxide, for example aluminum oxide, is provided in powdered form, with the particles ranging from about 5 to about 20 microns in diameter. The powder is injected into feedstock supply bore 20 using an inert carrier gas as previously described. It is to be understood that the powdered oxide in this embodiment is not melted during its passage through gun 11 in the production of metal matrix composites. This can be achieved by controlling the heat of the flame front, by increasing the particle size of the oxide, by controlling particle dwell time, and by adjusting other spray parameters. Where flame spray apparatus 10 is used, that is, without the electric are assembly, the particle temperature will generally be maintained above the particle softening point. The refractory oxide particle stream emerges from the end of barrel 14 and moves toward arc zone 82. The distance from the end of barrel 14 to arc zone 82 is preferably from about 4 to about 10 cm. Wires 78 and 80 are formed of a metal which may be an alloy. Suitable metals for use in fabricating metal-matrix composites include titanium, aluminum, steel, and nickel and copper-base alloys. Any metal can be used if it can be drawn into wire form. Other means of supplying molten metal such as through pipes or the like may be feasible. Powder cored wires may also be suitable. The flow rates of the materials are controlled by regulating the injection rate of the powdered feedstock or the rate at which the powdered feedstock is metered into the carrier gas. This produces a final metal-matrix composite having a refractory oxide content of from about 15 to about 50 percent by volume and a metal content of from about 85 to about 50 percent by volume. As the molten metal is atomized, a composite particle stream 115 is formed. Particle stream 115 includes high-velocity heated particles of refractory oxide, molten metal and agglomerates of molten metal, and refractory oxide. Target 116 may comprise a metal substrate to be coated with a layer of metal-matrix composite or it may comprise a mandrel or mold cavity as in the fabrication of near-net shapes. As will be understood, the methods of this invention are not limited to forming near net shapes, but may be used to form bulk forms, composite powders and various freestanding shapes.

Deposit 118 formed in accordance with the present invention is substantially fully dense. As used herein, the term "substantially fully dense" shall be defined as that state of a material in which the material contains less than about one percent by volume voids. In other words, the fully dense flame spray deposits of the present invention are preferably substantially fully dense such that the total volume of voids in the deposit is less than about one percent by volume of the deposit. The present invention provides a number of substantially fully dense metal-matrix composites which are highly homogeneous. These metal-matrix composites have exceptional metallurgical and physical properties and have not been commercially fabricated by any other known thermal spray process. Many of these compositions have improved characteristics over the wrought materials. They are extremely hard and wear-resistant and have low surface roughness. In the most preferred embodiment, the metal-matrix composites of the present invention have a refractory content of from about 5 to about 60 percent by volume of the composite material. Preferred refractory materials include refractory oxides, refractory carbides, refractory borides, refractory nitrides and refractory silicides. Particularly preferred are aluminum oxide, titanium diboride and silicon carbide. The refractory constituent is uniformly dispersed in a metal-matrix. Any metal can be used. Where the molten metal is introduced in the above-described two-wire arc method, the metal must be capable of being drawn into wire form. A metal comprises from about 40% to about 95%, and preferably from about 50% to about 85% by volume of the metal-matrix composite. Preferred metals include aluminum, titanium, and low-carbon steel. Particularly preferred metal-matrix composites formed in accordance with the present invention include substantially fully dense composites of 25% by volume aluminum oxide with 75% by volume aluminum or aluminum alloy. Also preferred herein are composites containing 25% by volume silicon carbide with 75% by weight aluminum or aluminum alloy. The refractory material is provided as a powder in the flame spray operation. The metal-matrix composites of the present invention can be formed as coatings or as near-net shapes which can be subjected to thermal treatment and can be shaped by conventional metal working techniques such as warm rolling or the like. These high-tech materials can be used to fabricate numerous devices such as aerospace components.

While a particular embodiment of this invention is shown and described herein, it will be understood of course, that the invention is not to be limited thereto since many modifications may be made, particularly by those skilled in this art, in light of this disclosure. For example, it may be suitable to operate flame spray system 10' with a powder, without utilizing the electric arc capacity. It will also be understood that various techniques for accelerating the refractory component in forming metal matrix composites may be used other than those set forth in the preferred embodiment such as by using a plasma spray gun. It is comtemplated therefore that the appended claims cover any such modifications as fall within the true spirit and scope of this invention.

I claim:

1. A supersonic flame spray apparatus, comprising:

a body portion including a powder bore having an inlet receiving a powdered feedstock and an inert carrier gas and an outlet;

a converging throat coaxially aligned and communicating with said powder bore outlet having a converging conical wall facing and spaced from said powder bore outlet;

an annular fuel passage surrounding said powder bore having an inlet receiving a fluid fuel and an outlet adjacent said powder bore outlet communicating with said throat;

an annular oxidant gas passage surrounding said fuel passage having an inlet receiving an oxidant gas and an outlet adjacent said powder bore and fuel outlets communicating with said throat;

said throat receiving said fuel and oxidant gas from said annular passage outlets prior to mixing and said conical wall spaced sufficiently from said passage outlets to permit mixing and combustion of said fuel and oxidant gas within said throat, said combustion and converging throat accelerating gaseous combustion products through an outlet at the apex of said conical wall coaxially aligned with said powder bore; and a barrel coaxially aligned with said powder bore communicating with said throat outlet having an opening receiving said gaseous combustion product and heated powdered feedstock and having an outlet discharging heated powder feedstock.

2. The supersonic flame spray apparatus defined in claim 1, characterized in that said fuel is injected into said converging throat adjacent the axis of said converging conical wall in greater than the stoichiometric proportions for complete combustion to said oxidant gas resulting in a fuel-rich mixture within said throat and creating a two-stage exothermic reaction within said converging throat including a continuous detonation adjacent said fuel and oxidant gas outlets and a flame front adjacent said throat outlet.

3. The supersonic flame spray apparatus defined in claim 1, characterized in that said annular oxidant gas passage converges relative to said annular fuel passage toward the axis of said powder bore directing said oxidant gas into and enveloping a flame front in said throat and injecting fuel into said flame front, creating continuous detonation in said throat accelerating said gaseous combustion product to supersonic velocity.

4. The supersonic flame spray apparatus defined in claim 1, characterized in that said powder bore outlet has a cross-sectional area which is substantially less than the cross-sectional areas of said annular fuel and oxidant gas passage outlets such that said powdered feedstock and inert carrier gas is fed into said throat at a greater velocity than said fuel and oxidant gases.

5. The supersonic flame spray apparatus defined in claim 1, characterized in that the cross-sectional area of said barrel is at least ten times the cross-sectional area of said powder bore.

6. The supersonic flame spray apparatus defined in claim 1, characterized in that said apparatus includes means feeding a liquid feedstock into said discharging heated powdered feedstock adjacent said barrel outlet, said discharging powdered feedstock atomizing and projecting said liquid feedstock substantially uniformly distributed in said powdered feedstock.

7. The supersonic flame spray apparatus defined in claim 6, characterized in that said means includes wire feed means continuously feeding the ends of at least two wires of metal feedstock into said discharging powdered feedstock adjacent said barrel outlet and electric power means establishing an electric arc across said wire ends, said electric arc melting said wire ends and forming said liquid feedstock.

8. A supersonic thermal spray apparatus, comprising:

a powder thermal spray apparatus including a body portion having an inlet receiving powdered feedstock and a carrier gas, means heating said powdered feedstock and accelerating said heated powdered feedstock and carrier gas, and a nozzle having an inlet receiving said heated powdered feedstock and carrier gas and an outlet directing said heated powdered feedstock toward a target, said carrier gas being accelerated to supersonic velocity; and feed means feeding a molten metal feedstock into said heated powdered feedstock adjacent said nozzle outlet, said powdered feedstock and carrier gas atomizing said molten metal feedstock and projecting said atomized molten metal feedstock substantially uniformly distributed in said heated powdered feedstock toward said target.

9. The supersonic thermal spray apparatus defined in claim 8, characterized in that said feed means includes means continuously feeding the ends of at least two rod-like elements of metal feedstock into said heated powder feedstock adjacent said nozzle outlet and electric power means establishing an electric arc across said rod-like element ends melting said ends and forming said molten metal feedstock.

10. The supersonic thermal spray apparatus defined in claim 8, characterized in that said apparatus includes a portion defining a powder bore having an inlet receiving said powdered feedstock and a carrier gas and an outlet communicating with a converging generally conical throat, a portion defining a fuel passage having an annular outlet surrounding said powder bore adjacent said powder bore outlet communicating with said converging throat, a portion defining an oxidant passage having an annular outlet surrounding said fuel passage adjacent said fuel passage outlet and communicating with said converging throat, ignition means for igniting an oxidant and a fuel within said throat and creating an exothermic reaction within said throat including a flame front and continuous combustion in said throat accelerating said heated powdered feedstock through said nozzle.

11. The supersonic thermal spray apparatus defined in claim 10, characterized in that said oxidant passage converges relative to said annular fuel passage toward the axis of said powder bore directing said oxidant into and enveloping said flame front in said throat.

12. The supersonic thermal spray apparatus defined in claim 10, characterized in that said powder bore outlet has a cross-sectional area which is substantially less than the cross-sectional areas of said annular fuel and oxidant passage outlets such that the powdered feedstock and inert carrier gas are fed into said throat at a greater velocity than said fuel and oxidant gases.

13. A supersonic flame spray apparatus, comprising:

a body portion having a feedstock bore including an outlet;

a converging throat coaxially aligned and communicating with said feedstock bore having a converging conical wall facing and spaced from said feedstock bore outlet;

a fuel gas passage having an inlet receiving a fuel gas and an annular outlet surrounding said feedstock bore communicating with said throat;

an oxidant gas passage having an inlet receiving an oxidant gas and an annular outlet surrounding said fuel gas outlet and adjaent thereto communicating with said throat;

said throat receiving said fuel and oxidant gases from said annular passage outlets prior to mixing of said gas and said conical wall spaced sufficiently from said passage outlets to permit mixing and combustion of said fuel and oxidant gases within said throat;

means igniting said fuel and oxidant gases within said throat creating a flame front and a steady state continuous detonation within said throat accelerating gaseous combustion products through an outlet at the apex of said conical wall coaxially aligned with said feedstock bore; and a barrel portion coaxially aligned with said feedstock bore communicating with said throat outlet having an opening receiving said gaseous combustion products and heated feedstock in a fine particulate and said barrel portion having an outlet discharging heated particulate feedstock.

14. The supersonic flame spray apparatus defined in claim 13, characterized in that said feedstock bore includes an inlet receiving a powdered feedstock and an inert carrier gas and said oxidant gas passage converges relative to said fuel gas passage toward the axis of said feedstock bore directing said oxidant gas into and enveloping said flame front in said throat.

15. The supersonic flame spray apparatus defined in claim 14, characterized in that said feedstock bore includes an outlet having a cross-sectional area which is substantially less than the cross-sectional areas of said annular fuel and oxidant gas passage outlets, such that said powdered feedstock and inert gas is fed into said throat at a greater velocity than said fuel and oxidant gases.

16. The supersonic flame spray apparatus defined in claim 13, characterized in that said apparatus includes means feeding a molten metal feedstock into said heated accelerated particulate feedstock adjacent said barrel outlet, said discharging particulate feedstock and gas atomizing and projecting said atomized liquid metal feedstock substantially uniformly distributed in said particulate feedstock.

17. A thermal spray apparatus, comprising:

a thermal spray gun including a body portion receiving feedstock, means heating said feedstock and accelerating said heated feedstock in fine particulate form, and a nozzle having an inlet receiving said heated accelerated particulate feedstock and an outlet directing said heated accelerated particulate feedstock and carrier gas toward a target; and feed means feeding a molten metal feedstock into said heated accelerated powdered feedstock adjacent said nozzle outlet, said accelerated heated particulate feedstock and carrier gas atomizing said molten metal feedstock and projecting said atomized molten metal feedstock substantially uniformly distributed in said heated particulate feedstock at said target.

18. The thermal spray apparatus defined in claim 17, characterized in that said feed means includes wire feed means continuously feeding the ends of at least two rod-like elements of metal feedstock into said heated accelerated particulate feedstock adjacent said nozzle outlet and electric power means establishing an electric arc across said element's ends melting said ends and forming said molten metal feedstock.

19. The supersonic thermal spray apparatus defined in claim 17, characterized in that said thermal spray gun includes a powder bore having an inlet receiving a powdered feedstock and an inert carrier gas and an outlet, annular fuel and oxidant passages surrounding said powder bore having inlets respectively receiving fuel and oxidant and separate outlets adjacent said powder bore outlet communicating with said throat, and ignition means igniting said fuel and oxidant gases within said throat, said throat receiving said fuel and oxidant from said annular passage outlets prior to mixing and said conical wall spaced sufficiently from said passage outlets to permit combustion of said fuel and oxidant within said throat.

20. The supersonic thermal spray apparatus defined in claim 17, characterized in that said fuel is injected axially into said throat into a flame front creating a fuel-rich mixture adjacent said fuel and oxidant passage outlets and a continuous steady-state combustion adjacent said passage outlets accelerating the products of combustion of said fuel and oxidant to supersonic velocity.

21. In a supersonic flame spray apparatus, a method of creating a continuous detonation accelerating products of combustion to supersonic velocity, said flame spray apparatus including a supply nozzle discharging into a combustion throat and said combustion throat discharging into an exhaust nozzle, said exhaust nozzle having an internal diameter which is less than the internal diameter of said combustion throat and said combustion throat communicating with said exhaust nozzle through a converging opening, said method comprising the steps of:

feeding hydrocarbon fuel and oxygen through said supply nozzle into said combustion throat;

igniting said fuel, creating a flame front within said combustion throat adjacent said throat discharge;

continuously feeding hydrocarbon gaseous fuel through said fuel nozzle directly into said flame front creating a continuous detonation adjacent said supply nozzle discharge in said converging throat accelerating the products of combustion of said hydrocarbon fuel and oxidant gases through said converging opening and said discharge nozzle.

22. In a supersonic flame spray apparatus, a method of creating a continuous detonation accelerating feedstock in a fine particulate form to supersonic velocity, said flame spray apparatus including a supply nozzle discharging into a combustion throat and said combustion throat discharging into an an exhaust nozzle, said combustion throat communicating with said exhaust nozzle through a converging opening, said method comprising the steps of:

feeding hydrocarbon fuel and an oxidant into said combustion throat;

creating a flame front within said combustion throat adjacent said fuel nozzle discharge by igniting said hydrocarbon fuel in said combustion throat;

continuously feeding hydrocarbon fuel through said supply nozzle directly into said flame front; and simultaneously and separately feeding an oxidant gas through said supply nozzle into said throat radially outwardly of said hydrocarbon fuel, said oxidant gas enveloping said flame front and creating continuous detonation; and feeding a feedstock into said throat and said continous detonation accelerating said feedstock in fine particulate form through said converging opening and said discharge nozzle.

23. The method of creating a continuous detonation in a supersonic flame spray apparatus defined in claim 22, wherein said method includes feeding said feedstock in powder form axially through said supply nozzle through said continuous detonation and said flame front, said flame front heating said powdered feedstock and accelerating said heated powdered feedstock through said exhaust nozzle.

24. The method of creating a continuous detonation in a supersonic flame spray apparatus as defined in claim 23, wherein said method further includes melting a metal feedstock adjacent the outlet of said exhaust nozzle, said heated powdered feedstock and gas atomizing and accelerating said melted metal feedstock substantially uniformly distributed in said powdered feedstock.

25. A method of heating and accelerating a feedstock in fine particulate form to supersonic velocity in a flame spray gun, said flame spray gun having a feedstock bore feeding said feedstock into a convergent combustion throat through a supply nozzle and said convergent combustion throat having an axial opening communicating with a discharge barrel of said gun, said method comprising:

feeding a fuel through a fuel opening in said supply nozzle into said convergent combustion throat;

feeding an oxidant through an annular oxidant opening in said supply nozzle surrounding said fuel opening into said convergent combustion throat and igniting said fuel and oxidant creating a two-stage exothermic reaction within said throat comprising a flame front and a steady-state continuous detonation;

separately feeding said feedstock into said convergent combustion throat through said supply nozzle into said two-stage exothermic reaction; and said continuous detonation and flame front within said convergent throat heating and accelerating said feedstock and the products of combustion of said fuel and oxidant through said axial opening and said discharge barrel.

26. The method of heating and accelerating a feedstock in a flame spray gun as defined in claim 25, wherein said method includes separately feeding said feedstock in a fine particulate suspended in an inert carrier gas through an axial feedstock opening in said supply nozzle coaxially aligned with said axial throat opening and separately feeding said fuel through an annular fuel opening surrounding said feedstock opening into said convergent combustion throat.

27. The method heating and accelerating a feedstock in fine particulate form to supersonic velocity as defined in claim 25, wherein said method includes feeding said fuel generally axially into said flame front, creating a fuel-rich fuel and oxidant mixture adjacent said supply nozzle, thereby increasing the energy of said continuous detonation.

28. The method of heating and accelerating a feedstock to supersonic velocity in a flame spray gun as defined in claim 25, wherein said method includes feeding a molten metal stock into said heated and accelerated feedstock adjacent the outlet of said discharge barrel, said accelerated fine particulate feedstock and gas atomizing and projecting said atomized liquid metal feedstock substantially uniformly distributed in said particulate feedstock toward a target.

29. The method of heating and accelerating a feedstock to supersonic velocity in a flame spray gun as defined in claim 28, wherein said method further includes continuously feeding the ends of at least two wires of metal feedstock into said accelerated fine particulate feedstock and establishing an electric arc across said wire ends, said electric arc melting said wire ends and forming said molten metal feedstock.

30. A method of heating and accelerating a powdered feedstock to near supersonic velocity in a flame spray gun, said flame spray gun having a feedstock bore feeding said powdered feedstock into a convergent combustion throat through a supply nozzle and said combustion throat having an axial opening coaxially aligned with said feedstock bore communicating with a discharge nozzle of said gun, said method comprising:

separately feeding a fuel through an annular fuel opening in said supply nozzle surrounding said feedstock bore into said convergent combustion throat;

separately feeding an oxidant through an annular oxidant opening in said supply nozzle surrounding said fuel opening into said convergent combustion throat and igniting said fuel and oxidant creating a flame front within said convergent combustion throat, said fuel feeding said flame front and a fuel-rich zone adjacent said flame front and establishing a continuous detonation within said convergent combustion throat;

separately feeding said powdered feedstock and a carrier gas into said convergent combustion throat through said feedstock bore and into said flame front; and said continuous detonation and flame front within said convergent throat accelerating the products of combustion of said fuel and oxidant to supersonic velocity and propelling said powdered feedstock through said throat opening and said discharge barrel.

31. The method of heating and accelerating a powdered feedstock in a flame spray gun as defined in claim 30, wherein said method includes feeding said oxidant through said annular supply nozzle opening in a convergent cone- shaped pattern feeding and enveloping said flame front and further reacting the fuel received from said continuous detonation.

32. The method of heating and accelerating a powdered feedstock in a flame spray gun as defined in claim 30, wherein said method includes feeding said powdered feedstock and inert gas into said convergent combustion throat at a substantially greater velocity than the velocities of said fuel and oxidant.

33. The method of heating and accelerating a powdered feedstock in a flame spray gun as defined in claim 30, wherein said method further includes feeding a liquid feedstock into said heated and accelerated powdered feedstock adjacent said discharge barrel outlet, said accelerated powdered feedstock and gas atomizing and projecting said atomized liquid feedstock substantially uniformly distributed in said powdered feedstock.

34. The method of heating and accelerating a powdered feedstock in a flame spray gun as defined in claim 30, wherein said method includes continuously feeding the ends of at least two wires of metal feedstock into said accelerated powdered feedstock and establishing an electric arc across said wire ends melting said wire ends and forming said liquid feedstock.

35. A method of heating and accelerating a feedstock in fine particulate form to near supersonic velocity in a flame spray gun, said flame spray gun having a convergent conical throat discharging through an axial opening into a discharge barrel having an outlet opening, said method comprising:

separately feeding fuel and oxidant gases prior to mixing into said convergent throat and igniting said gases, creating a two-stage exothermic reaction within said throat comprising a flame front and a steady state continuous detonation;

separately feeding said feedstock into said two-stage exothermic reaction within said convergent throat heating and accelerating said feedstock to supersonic velocity and discharging said feedstock in fine particulate form and the gaseous products of combustion of said fuel and oxidant gases through said throat opening and said discharge barrel.

36. The method of heating and accelerating a feedstock in a flame spray gun as defined in claim 35, wherein said method further includes feeding said oxidant gas into said convergent conical throat through an annular opening surrounding said flame front, said oxidant gas feeding and enveloping said flame front, and feeding said fuel gas axially into said flame front creating a fuel-rich continous detonation zone adjacent said flame front increasing the energy of said continuous detonation.

37. The method of heating and accelerating a feedstock in a flame spray gun as defined in claim 35, wherein said method includes separately feeding said oxygen into said combustion throat through said annular opening at a converging angle generating a conical pattern converging toward said axial opening and enveloping said flame front.

38. The method of heating and accelerating a feedstock in a flame spray gun as defined in claim 37, wherein said method further includes feeding said feedstock as a powder suspended in an inert carrier gas into said throat through a feed bore coaxially aligned with said throat axial opening, separately feeding said fuel gas into said throat through an annular opening surrounding said feed bore and separately feeding said oxidant gas into said throat through an annular opening surrounding said fuel gas annular opening.

39. The method of heating and accelerating a feedstock in a flame spray gun as defined in claim 38, wherein said method includes feeding said powdered feedstock into said throat at a substantially greater velocity than the velocities of said fuel and oxidant gases.

40. The method of heating and accelerating a feedstock in a flame spray gun as defined in claim 39, wherein said method includes feeding said oxidant gas into said throat at a convergent cone angle surrounding and enveloping said flame front.

41. The method of heating and accelerating a feedstock in a flame spray gun as defined in claim 35, wherein said method further includes feeding a molten metal feedstock into said heated and accelerated fine particulate feedstock adjacent said discharge barrel outlet, said fine particulate feedstock atomizing and projecting said molten metal feedstock substantially uniformly distributed in said fine particulate feedstock.

42. The method of heating and accelerating a feedstock in a flame spray gun as defined in claim 41, wherein said method further includes feeding the ends of at least two wires of metal feedstock into said heated fine particulate feedstock adjacent said discharge barrel outlet and establishing an electric arc across said wire ends melting said wire ends and forming said molten metal feedstock.

43. A method of heating and accelerating a powdered feedstock to supersonic velocity in a flame spray gun, said flame spray gun having a powder bore receiving powdered feedstock suspended in an inert carrier gas communicating with a convergent conical throat, said throat discharging through an axial opening into a discharge barrel having an outlet opening, said method comprising:

separately feeding fuel and oxidant through separate openings spaced radially outwardly from said powder bore into said throat, igniting said fuel and oxidant and creating a two-stage exothermic reaction within said throat, including a flame front and a steady state continuous detonation;

separately feeding said powdered feedstock through said powder bore into said continuous detonation and flame front within said throat; and said flame front, continuous detonation and converging throat heating and accelerating said powdered feedstock to supersonic velocity from said barrel outlet and discharging said powdered feedstock and the products of combustion of said fuel and oxidant through said throat opening and through said barrel outlet.

44. The method of heating and accelerating a powdered feedstock to supersonic velocity as defined in claim 43, wherein said method includes feeding said oxidant and fuel through separate generally concentric annular openings surrounding said powder bore wherein said oxidant gas is fed through the outermost annular opening and said oxidant surrounding and enveloping said flame front, and feeding said fuel axially into said flame front creating a fuel-rich continuous detonation zone adjacent said flame front increasing the energy of said detonation detonation.

45. The method of heating and accelerating a powdered feedstock as defined in claim 43, wherein said method further includes feeding a liquid feedstock into said heated and accelerated powdered feedstock adjacent said barrel outlet, said accelerated feedstock atomizing and projecting said liquid feedstock substantially uniformly distributed in said powdered feedstock.

46. In a supersonic flame spray apparatus, a method of accelerating products of combustion to supersonic velocity, said flame spray apparatus including a supply nozzle discharging into a combustion throat and said combustion throat discharging into an exhaust nozzle, said method comprising the steps of:

feeding hydrocarbon fuel and oxygen through said supply nozzle into said combustion throat;

igniting said fuel, creating a flame front within said combustion throat adjacent said throat discharge;

continuously feeding hydrocarbon gaseous fuel through said fuel nozzle directly into said flame front creating an extremely rapid combustion reaction adjacent said supply nozzle discharge in said converging throat accelerating the products of combustion of said hydrocarbon fuel and oxidant gases through said converging opening and said discharge nozzle.

47. A method of heating and accelerating a feedstock in fine particulate form to supersonic velocity in a flame spray gun, said flame spray gun having a feedstock bore feeding said feedstock into a convergent combustion throat through a supply nozzle and said convergent combustion throat having an axial opening communicating with a discharge barrel of said gun, said method comprising:

feeding a fuel through a fuel opening in said supply nozzle into said convergent combustion throat;

feeding an oxidant through an annular oxidant-opening in said supply nozzle surrounding said fuel opening into said convergent combustion throat and igniting said fuel and oxidant creating an extremely rapid combustion reaction;

separately feeding said feedstock into said convergent combustion throat through said supply nozzle into said extremely rapid combustion reaction; and said extremely rapid combustion reaction within said convergent throat heating and accelerating said feedstock and the products of combustion of said fuel and oxidant through said axial opening and said discharge barrel.

48. The method of heating and accelerating a feedstock in a flame spray gun as defined in claim 47, wherein said method includes separately feeding said feedstock in a fine particulate form suspended in an inert carrier gas through an axial feedstock opening in said supply nozzle coaxially aligned with said axial throat opening and separately feeding said fuel through an annular fuel opening surrounding said feedstock opening into said convergent combustion throat.

49. The method of heating and accelerating a feedstock in fine particulate form to supersonic velocity as defined in claim 47, wherein said method includes creating a flame front in said throat and creating a fuel-rich fuel and oxidant mixture adjacent said supply nozzle, thereby increasing the energy of said combustion reaction.

50. The method of heating and accelerating a feedstock to supersonic velocity in a flame spray gun as defined in claim 47, wherein said method includes feeding a second feedstock comprising molten metal into said heated·and accelerated particulate feedstock adjacent the outlet of said discharge barrel, said accelerated particulate feedstock and gas atomizing and projecting said molten metal feedstock substantially uniformly distributed in said particulate feedstock toward a target.

51. The method of heating and accelerating a feedstock to supersonic velocity in a flame spray gun as defined in claim 47, wherein said method further includes continuously feeding the ends of at least two wires of metal feedstock into said accelerated particulate feedstock and establishing an electric arc across said wire ends, said electric arc melting said wire ends and forming a molten metal feedstock.

52. A method of heating and accelerating a feedstock in fine particualte form to near supersonic velocity in a flame spray gun, said flame spray gun having a convergent conical throat discharging through an axial opening into a discharge barrel having an outlet opening, said method comprising:

separately feeding fuel and oxidant gases prior to mixing into said convergent throat and igniting said gases, creating a reaction within said throat comprising a flame front and an extremely rapid combustion reaction; and separately feeding said feedstock into said reaction within said convergent throat heating and accelerating said feedstock and discharging said feedstock in fine particulate form and the gaseous products of combustion of said fuel and oxidant gases through said throat opening and said discharge barrel.

53. The method of heating and accelerating a feedstock in a flame spray gun as defined in claim 52, wherein said method includes separately feeding said oxygen into said combustion throat at a converging angle generating a conical pattern converging toward said axial opening and enveloping said flame front.

54. The method of heating and accelerating a feedstock in a flame spray gun as defined in claim 52, wherein said method further includes feeding said feedstock as a powder suspended in an inert carrier gas into said throat through a feed bore coaxially aligned with said throat axial opening, separately feeding said fuel gas into said throat through a fuel gas annular opening surrounding said feed bore and separately feeding said oxidant gas into said throat through an annular opening surrounding said fuel gas annular opening.

55. The method of heating and accelerating a feedstock in a flame spray gun as defined in claim 52, wherein said method includes feeding said powdered feedstock into said throat at a substantially greater velocity than the velocities of said fuel and oxidant gases.

56. The method of heating and accelerating a feedstock in a flame spray gun a defined in claim 52, wherein said method further includes feeding the ends of at least two wires of metal feedstock into said heated fine particulate feedstock adjacent said discharge barrel outlet and establishing an electric arc across said wire ends melting said wire ends and forming a molten-metal feedstock.

57. A supersonic thermal spray apparatus, comprising:

a thermal spray gun having a feedstock inlet receiving feedstock in fine particulate form suspended in a carrier gas, a nozzle having an inlet receiving said feedstock and carrier gas and an outlet directing said feedstock and carrier gas toward a target, and said thermal spray gun having means heating said fine particulate feedstock and accelerating said feedstock carrier gas to at least supersonic velocity; and feed means feeding a metal rod-like element into said supersonically accelerated carrier gas and heated fine particulate feedstock, melting and atomizing said metal rod-like element and projecting said atomized molten metal substantially uniformly distributed in said particulate feedstock toward said target.

58. The supersonic thermal spray apparatus defined in claim 57, characterized in that said feed means includes means continuously feeding at least two rod-like metal elements into said supersonically accelerated carrier gas and heated fine particulate feedstock adjacent said nozzle outlet and electric power means establishing an electric arc across said metal rod-like elements melting said rod-like elements.

59. The supersonic spray apparatus defined in claim 57, characterized in that said thermal spray gun includes gas inlets receiving fuel and oxidant gases, a combustion zone receiving said fuel and oxidant gases and said fine particulate feedstock and carrier gas, and ignition means igniting said fuel and oxidant gases, heating and accelerating said fine particulate feedstock through said nozzle, said heated accelerated feedstock melting and atomizing said metal rod-like element and projecting said atomized molten metal substantially uniformly distributed in said heated accelerated particulate feedstock toward said target.

60. The supersonic thermal spray apparatus defined in claim 59, characterized in that said thermal spray gun includes a fuel nozzle defining an axial bore having an inlet receiving said fine particulate stock and carrier gas and an outlet discharging into said combustion zone, said fuel nozzle also defining a separate fuel gas passage surrounding said axial bore having an exit adjacent said axial bore outlet, and said fuel nozzle further defining a separate oxidant gas passage surrounding said fuel gas passage having an exit adjacent said axial bore and fuel gas passages.

61. A flame spray apparatus, comprising:

a flame spray gun having a confined combustion zone communicating with a nozzle exit, a fuel nozzle defining a feedstock bore having an inlet receiving feedstock in fine particulate form suspended in a carrier gas and an outlet directing said fine particulate feedstock and carrier gas through said combustion zone and nozzle exit, said fuel nozzle also defining fuel and oxidant gas passages communicating with said combustion zone, and means for igniting fuel and oxidant gases within said combustion zone thereby heating and accelerating said fine particulate feedstock and carrier gas through said nozzle exit; and feed means feeding a molten metal feedstock into said heated and accelerated fine particulate feedstock adjacent said nozzle exit, said heated and accelerated fine particulate feedstock atomizing said molten metal feedstock and projecting said atomized molten metal feedstock substantially uniformly distributed in said heated fine particulate feedstock.

62. The flame spray apparatus defined in claim 61, characterized in that said feedstock bore extends through said fuel nozzle generally coaxially aligned with said combustion zone and nozzle exit, said fuel gas passage surrounding said feedstock bore and having an inlet receiving fuel gas and an outlet adjacent said feedstock bore outlet communicating with said combustion zone and said oxidant gas passage surrounding said fuel gas passage and having an inlet receiving oxidant gas and an outlet adjacent said fuel gas passage outlet communicating with said combustion zone.

63. A method of forming a spray of an atomized molten metal substantially uniformly distributed in a heated particulate feedstock directed toward a target, comprising the following steps:

heating and accelerating in a thermal spray gun a spray of a heated particulate feedstock directed toward said target; and feeding a molten metal feedstock into said spray of heated and accelerated particulate feedstock, said spray of heated particulate feedstock atomizing said molten metal feedstock and forming said substantially uniformly distributed spray of atomized molten metal and particulate feedstock.

64. The method defined in claim 63, wherein said method includes heating and accelerating in a thermal spray gun a spray of a particulate feedstock entrained in a carrier gas, wherein said carrier gas is accelerated to at least supersonic velocity.

65. The method defined in claim 63, wherein said method includes feeding a metal rod-like element into said heated and accelerated spray of a particulate feedstock, heating and melting said rod-like element, and said heated particulate spray then atomizing said molten metal feedstock and forming said substantially uniformly distributed spray of atomized molten metal and heated particulate feedstock directed toward said target.

66. The method defined in claim 65, wherein said method includes feeding at least two metal rod-like elements into said spray of heated and accelerated particulate feedstock, establishing an electric arc across said metal rod-like elements, melting said rod-like elements in said spray of heated and accelerated particulate feedstock.

67. A method of forming a spray of an atomized molten metal substantially uniformly distributed in a heated particulate feedstock directed toward a target, comprising the following steps:

providing a flame spray gun having a confined combustion zone communicating with an outlet nozzle bore;

feeding a particulate feedstock entrained in a carrier gas through said combustion zone and outlet nozzle bore;

feeding a fuel and oxidant into said combustion zone and igniting said fuel, the resultant combustion heating and accelerating said particulate feedstock and carrier gas through said outlet nozzle bore in a spray, with said carrier gas accelerated to supersonic velocity; and feeding a molten metal feedstock into said heated and accelerated particulate feedstock adjacent said outlet nozzle bore, said accelerated particulate feedstock and carrier gas atomizing and projecting said atomized molten metal feedstock substantially uniformly distributed in said particulate feedstock toward a target.

68. The method defined in claim 67, including feeding a metal rod-like element into said supersonically accelerated carrier gas and heated particulate feedstock, melting said metal rod-like element in said supersonically accelerated carrier gas and heated particulate feedstock.

69. The method defined in claim 68, wherein said method includes feeding at least two rod-like metal elements into said supersonically accelerated carrier gas and heated particulate feedstock and establishing an electric arc across rod-like elements, said electric arc melting said metal rod-like elements and forming said molten metal feedstock.

70. A supersonic flame spray apparatus, comprising:

a body portion having a fuel nozzle assembly therein, said fuel nozzle assembly defining an axial powder bore having an inlet for receiving a particulate feedstock and an outlet, a separate fuel gas passage spaced outwardly from said powder bore and having an inlet and an outlet, said gas passage outlet being adjacent said powder bore outlet, and a separate oxidant gas passage spaced outwardly from said powder bore and having an inlet and an outlet, said oxidant gas passage outlet being adjacent said powder and fuel gas passage outlets, said powder bore outlet, said fuel gas passage outlet and said oxidant gas passage outlet being substantially aligned in a single plane;

an elongated discharge barrel attached to said body portion for conveying a collimated particle stream, said elongated discharge barrel having a bore substantially axially aligned with said powder bore;

means for separately supplying and independently controlling the supply of a particulate feedstock, an oxidant gas and a fuel gas through said powder bore, said oxidant gas passage and said fuel gas passage, respectively, and for creating a collimated stream of heated, accelerated particles of particulate feedstock which passes through said elongated discharge barrel toward a target, said supplying and controlling means including means for providing an inert carrier gas for carrying said particulate feedstock; and wherein said inert carrier gas and combustion gases resulting from combustion of said fuel gas are accelerated by said flame spray apparatus to substantially supersonic velocity.

71. The supersonic flames spray apparatus recited in claim 70, further comprising a confined combustion zone opposite said powder bore, said fuel and oxidant gas passage outlets in flow communication with said combustion zone.

72. The supersonic flame spray apparatus recited in claim 71, further comprising ignition means in association with said flame spray apparatus for igniting fuel gas and oxidant within said combustion zone.

73. The supersonic flame spray apparatus defined in claim 71, further characterized in that said oxidant gas passage outlet surrounds said fuel gas passage outlet such that said oxidant gas envelops said fuel gas within said combustion zone and said particulate feedstock is accelerated into said combustion zone solely by said inert carrier gas, wherein separate control of the flow rates of said particulate feedstock, fuel gas and oxidant gas are provided.

74. The supersonic flame spray apparatus defined in claim 71, characterized in that said confined combustion zone comprises a converging conical throat coaxially aligned and communicating with said powder bore outlet and said fuel and oxidant gas outlets, the diameter of said converging conical combustion throat adjacent said outlets being greater than the outlet of said fuel gas passage.

75. The supersonic flame spray apparatus defined in claim 74, said supersonic flame spray apparatus being further characterized in that the axial length of said converging conical combustion throat is greater than the diameter of said converging conical combustion throat adjacent said fuel and oxidant gas outlets, such that in operation a flame front is generated within said combustion throat heating and accelerating said fine particulate feedstock and said carrier gas.

76. The supersonic flame spray apparatus defined in claim 70, characterized in that said apparatus includes means for feeding a liquid feedstock into said collimated stream adjacent said elongated discharge barrel, said collimated stream atomizing and projecting said liquid feedstock substantially uniformly distributed in said collimated stream.

77. A supersonic flame spray apparatus, comprising:

a body portion having a fuel nozzle assembly therein, said fuel nozzle assembly defining an axial powder bore having an inlet for receiving a particulate feedstock and an outlet, a separate fuel passage surrounding said powder bore having an inlet receiving a fuel gas and a separate outlet adjacent said powder bore outlet, and a separate oxidant gas passage surrounding said powder bore having an inlet receiving oxidant gas and a separate outlet adjacent said powder and fuel gas passage outlets, said powder bore outlet and said fuel and oxidant gas outlets being generally aligned in a single plane;

an elongated discharge barrel for conveying a collimated particle stream, said elongated discharge barrel having a bore coaxially aligned with said powder bore;

a confined combustion zone opposite said powder bore and said fuel and oxidant gas passage outlets and communicating therewith;

ignition means for igniting fuel gas and oxidant within said combustion zone;

means for feeding and controlling the feed of particulate feed stock entrained in an inert carrier gas to said powder bore;

means for feeding and controlling the feed of fuel gas to said fuel gas passage;

means for feeding and controlling the feed of oxidant gas to said oxidant gas passage;

wherein a particulate feedstock, fuel gas and oxidant gas each separately enter said combustion zone through said adjacent outlets and wherein combustion in said combustion zone heats said particulate feedstock and accelerates said particulate feedstock through said elongated discharge barrel as a collimated stream of heated, accelerated particles of said particulate feedstock toward a target.

78. The supersonic flame spray apparatus recited in claim 77, characterized in that said oxidant gas passage outlet surrounds said fuel gas passage outlet such that oxidant gas envelopes fuel gas within said combustion zone and said fuel gas is ignited within said oxidant gas envelope, and said particulate feedstock is accelerated into said combustion zone solely by an inert carrier gas wherein separate control of the flow rates of said particulate feedstock, fuel gas and oxidant gas is provided.

79. The supersonic flame spray apparatus defined in claim 77, characterized in that said confined combustion zone comprises a converging conical throat coaxially aligned and communicating with said powder bore outlet and said fuel and oxidant gas outlets, the diameter of said converging conical combustion throat adjacent said outlets being greater than the outlet of said fuel gas passage.

80. The supersonic flame spray apparatus defined in claim 79, characterized in that the axial length of said converging conical throat is greater than the diameter of said converging conical throat adjacent said fuel and oxidant gas outlets such that a flame front is generated within said combustion throat heating and accelerating said particulate feedstock and said carrier gas.

* * * * *